United States Patent [19]
Gai

[11] Patent Number: 5,156,574
[45] Date of Patent: Oct. 20, 1992

[54] POWER-ASSISTED CHAIN DRIVE ACTUATOR FOR OPENING AND CLOSING GATING FIXTURES

[75] Inventor: Giorgio Gai, Genoa, Italy
[73] Assignee: Ultraflex S.r.l., Genoa, Italy
[21] Appl. No.: 731,976
[22] Filed: Jul. 18, 1991

[30] Foreign Application Priority Data

Nov. 6, 1990 [IT] Italy .................. 15170/90

[51] Int. Cl.⁵ ............................. F16G 13/00
[52] U.S. Cl. .................. 474/155; 474/212; 474/213
[58] Field of Search .............. 474/155–157, 474/212–217, 232–234, 206

[56] References Cited

U.S. PATENT DOCUMENTS 511,137 12/1893 Grueter et al. .................. 474/155
2,321,702 6/1943 Renkin .................. 474/155
3,153,348 10/1964 Kuntzmann .................. 474/213 X
5,092,822 3/1992 Wakabayashi .................. 474/212 X Primary Examiner—Thuy M. Bui

[57] ABSTRACT

In a power-assisted chain drive actuator for opening and closing gating fixtures, a drive chain has successive links formed of pairs of plates being parallel and swivel connected to each other by crosswise studs having an increased middle diameter holding the plates apart; the chain is also provided with members for limiting the relative angular displacement of adjacent links in the chain; between the middle increased diameters there engage the teeth of a drive sprocket; the limiting members prevent the chain from becoming deflected in the direction of its remote side from the drive sprocket past a position of substantially straight alignment of the links and take up the bending couples on the chain on application of a push force to a fixture leaf.

7 Claims, 3 Drawing Sheets

POWER-ASSISTED CHAIN DRIVE ACTUATOR FOR OPENING AND CLOSING GATING FIXTURES

This invention relates to a power-assisted chain drive actuator for opening and closing gating fixtures, which comprises a drive sprocket and a chain engaged with said sprocket and adapted to apply a push-pull action to a fixture leaf.

An actuator of this kind is known from U.S. Pat. No. 4,521,993. The construction of the drive chain in this conventional actuator imposes limitations to the push forces that can be transferred to a fixture leaf thereby. Such prior actuators, in fact, cannot be used for operating fixture leaves which be very large and heavy. For this same reason, conventional actuators, and especially their drive chains, are in constant danger of suffering damage from such causes as jamming or stiffening of the linkage of the fixture leaves. The use of conventional chains, moreover, baffles the important demand for minimum bulk of the actuators to make their installation more convenient. Indeed, they require sprocket wheels of relatively large diameter which substantially hinder any further reduction in the size of the actuators.

It is the object of this invention to provide a chain drive actuator as set forth in the preamble, which can obviate the above-noted drawbacks of conventional actuators while using a chain of simple and economical construction.

The invention achieves this object through an actuator as specified above, which has a drive chain comprising successive chain links formed of pairs of mutually parallel plates swivel-connected to one another by transverse studs which include an enlarged middle diameter for holding the plate pair apart, thereby one sprocket tooth can engage between every two successive link studs, the plates of each link having, on the remote chain side from the drive sprocket, members for limiting the angular relative displacement of adjacent links which prevent deflection of the chain in the direction toward its remote side from the drive sprocket past a position of substantially straight alignment of the links and take up the chain bending couples on a fixture leaf being applied a push action.

This feature of the invention provides a drive chain for power-assisted actuators to operate gating fixture leaves which can ensure, on the one side, enhanced strength construction and ability to transfer large push forces, and on the other side, advantageous utilization of chain drive sprockets having much smaller diameters. In fact, the sprocket wheel teeth can be set closer together correspondingly with the increased diameter of the studs. With the inventive drive chain, it not only becomes possible to apply larger push forces than in conventional actuators, but also to effectively remove what constitutes the major impediment to the making of a more compact actuator.

These and other features of the invention will be discussed in greater detail in the following description, with reference to the accompanying drawings, wherein.

Figure 1:
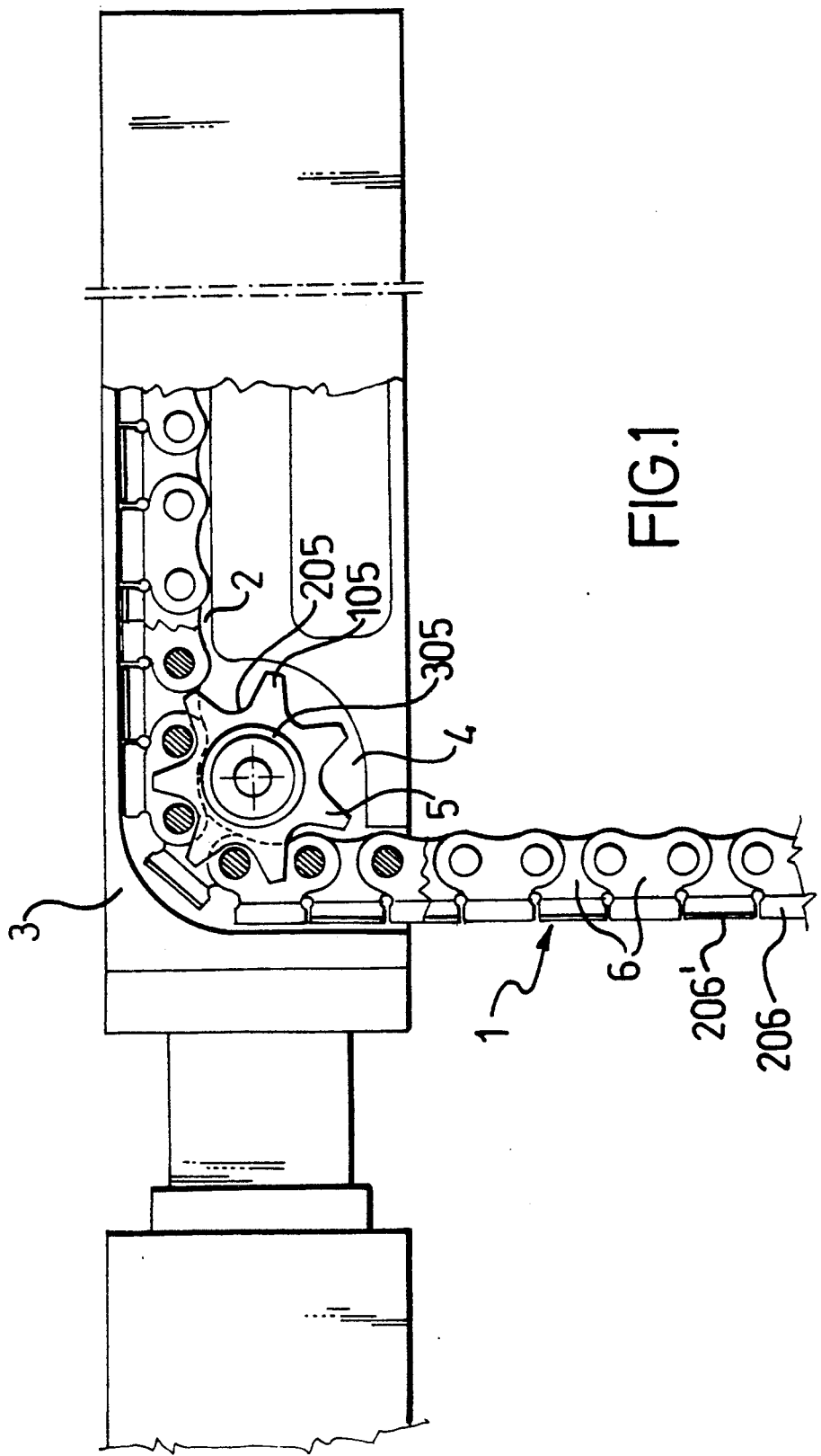
FIG. 1 is a part-sectional top view of an actuator according to the invention.

With reference to FIG. 1, in the environment of a power-assisted chain drive actuator for operating gating fixture leaves, a drive chain 1 is arranged to run in a chain guide 2 provided in a holder member 3. The guide 2 is set at an angle of about 90° and defines the amount by which the chain 1 departs from a direction substantially parallel to the actuator length direction, along a transverse direction thereto, the exit opening for the chain 1 being arranged on one of the actuator longitudinal sides. Formed in the corner region of the guide 2 is a substantially circular socket 4 for accomodating a drive sprocket wheel 5 therein. The chain 1 engages said sprocket wheel 5 at the corner region of guide 2. The drive sprocket wheel 5 would be usually rotated through a suitable drive arrangement from an eletric motor, not shown.

The chain 1 is constructed such that it can only be flexed in the direction of its side associated with the drive sprocket 5, whereas in the direction of its remote side from the drive sprocket 5, the chain cannot be flexed past a position of mutual straight-line alignment of its links 6. In this straight alignment condition, the drive chain 1 can apply a push-pull action to a fixture leaf.

Figure 3:
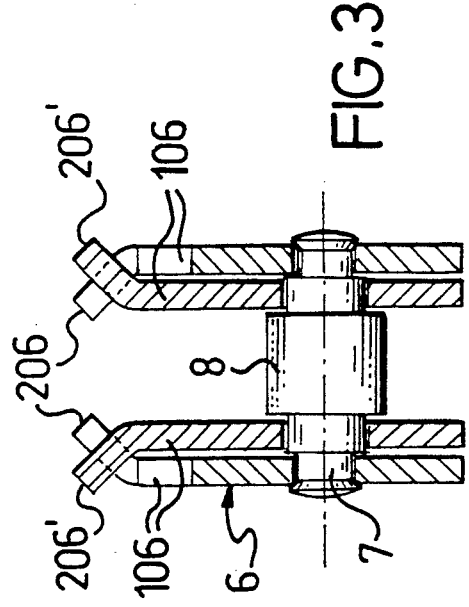
FIG. 3 is a cross-sectional view through said drive chain, taken along the line III—III in FIG. 2.
Figure 2:
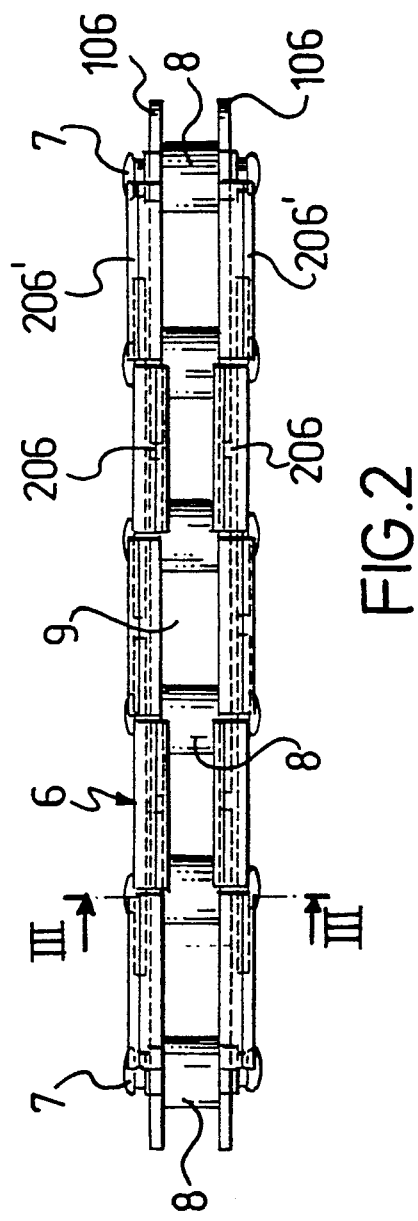
FIG. 2 is a top plan view of the drive chain of the actuator shown in FIG. 1.

Accordingly, and as shown in FIGS. 2 and 3, the chain links 6 comprise pairs of parallel link plates 106 which are swivel connected to one another by means of cross-wise studs 7. The plates 106 are held apart by the middle portion 8 of the studs 7 having an increased diameter. The studs 7, or rather the middle enlargements 8 thereof, delimit gaps 9 therebetween, each engaged by a tooth 105 of the drive sprocket 5 as the drive chain is entrained around the sprocket 5. The hollows 205 between the teeth 105 of the sprocket 5 are suitably shaped to respectively receive the middle enlargement 8 of one stud 7. In this way, the teeth 105 on the drive sprocket 5 can be set relatively close together to produce a drive sprocket wheel 5 of comparatively small diameter. The small diameter feature of the drive sprocket is enhanced, moreover, by the plate 106 side facing toward the drive sprocket 5 being advantageously made concave to match the radius of curvature of a central hub 305, if any, of the drive sprocket 5. Said hub 305 may suitably be a part of the drive arrangement, such as a worm and gear drive, for transmitting motion from the motor to the drive sprocket 5.

The plates 106 of each link 6 have, on their remote side from the drive sprocket 5, a member for limiting their angular displacement relatively to the plates of an adjacent link. This member consists of an abutment extension 206, 206' of said plates 106, the end surfaces whereof are adapted to co-operate with those of the abutment extension 206', 206 of adjacent plates 106, in the sense that their mutual angular displacement is checked. Said extensions 206, 206' lie symmetrically about the transverse centerline of the plates 106 and have a length dimension effective to bring them into mutual abutment relationship, with the chain links 6 extending in a straight line. In this condition, said extensions 206, 206' will allow the chain to apply a push force to a fixture leaf against the couple forces tending to deflect the chain in the direction away from the drive sprocket 5.

In order to provide a stable surface of mutual abutment even with large push forces, and to prevent proper operation of the chain from being interfered with by deformation of the end surfaces of the abutment extensions 206, 206', the opposed plates 106 of the chain links 6 are alternately provided with mutually converging 206 and diverging 206' abutment extensions. As shown in FIG. 3, the diverging abutment extensions 206', for example, of the plate pair 106 of a link 6 will meet the converging abutment extensions 206 of the plates 106 of an adjacent link crosswise, so that a positive abutting relationship can be established therebetween at the end surfaces facing each other.

Instead of the extensions, the angular displacement limiting function could be performed by walls interconnecting the plates of each chain link.

Figure 4:
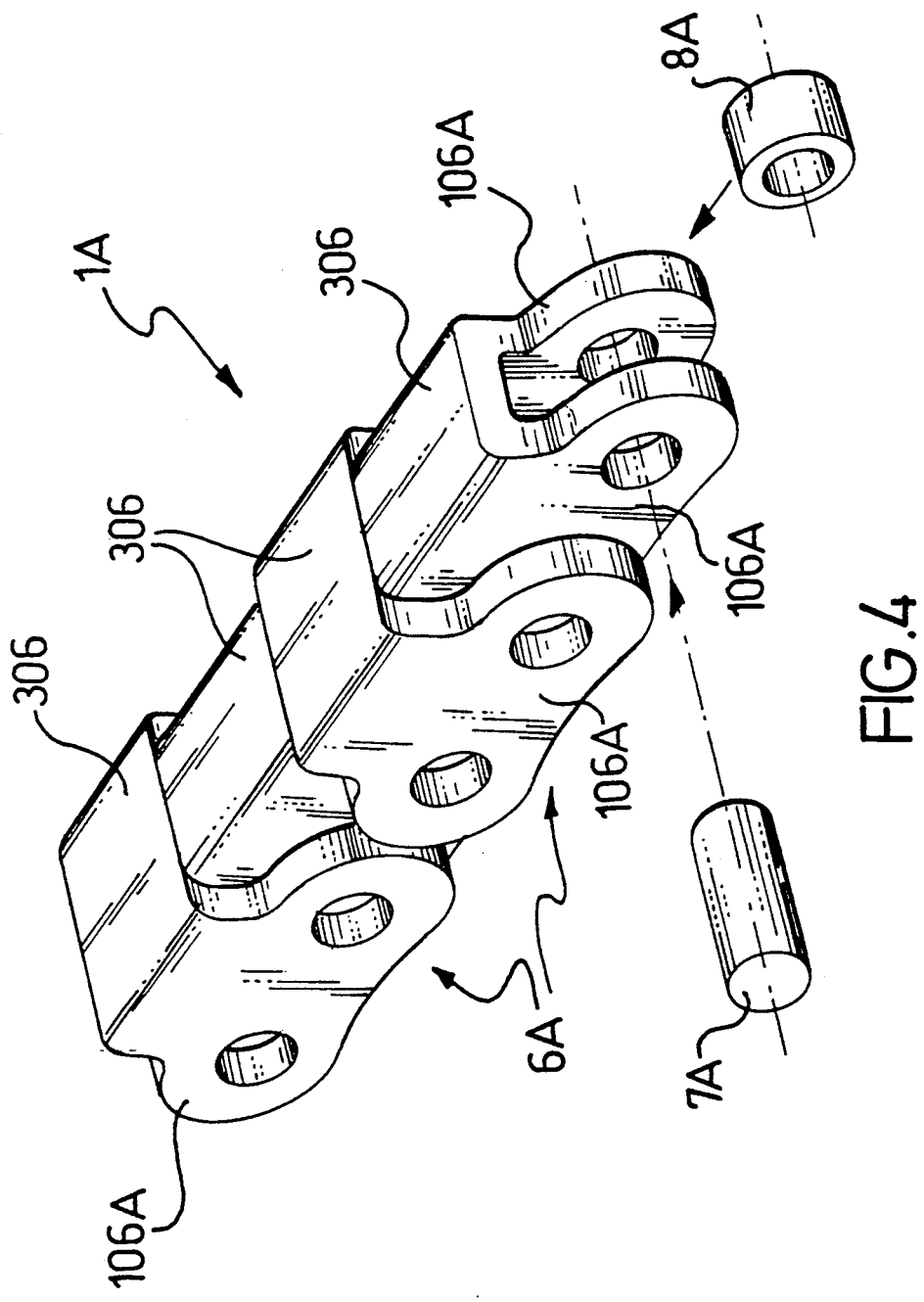
FIG. 4 is a partially exploded perspective view of a modification of said drive chain.

This is illustrated by FIG. 4, where the chain is indicated at 1A and similar or equivalent components thereof are denoted by the same reference numerals with a suffix "A". The plates 106A in each plate pair are, in fact, joined integrally by a wall shown at 306.

The walls 306 serve the function of angular displacement limiting members in that, with the chain links 6A substantially extending in a straight line, it is the end surfaces of the walls 306 that abut here against each other, as shown in FIG. 4. These walls 306 still allow, however, the chain 1A to flex in the direction of its side associated with the drive sprocket 5, in a similar way as the extensions 206, 206'.

The walls 306 may include ridges, ribs, or the like provisions adapted to abut against each other in the aforesaid straight-line condition of the drive chain 1A.

I claim:

1. A power-assisted chain drive actuator for opening and closing gating fixtures, which comprises a drive sprocket and a chain engaged with said sprocket and adapted to apply a push-pull action to a fixture leaf, characterized in that the drive chain comprises successive chain links formed of pairs of mutually parallel plates swivel-connected to one another by transverse studs which include an enlarged middle diameter for holding the plate pair apart, thereby one sprocket tooth can engage between every two successive link studs, the plates of each link having, on the remote chain side from the drive sprocket, members for limiting the angular relative displacement of adjacent links which prevent deflection of the chain in the direction toward its remote side from the drive sprocket past a position of substantially straight alignment of the links and take up the chain bending couples on application of a push force to a fixture leaf.

2. An actuator according to claim 1, characterized in that the member for limiting the mutual angular displacement of the links comprises a checking extension provided integrally on the remote side from the drive sprocket of each plate, the checking extensions having cross-wise extending surfaces of mutual abutment against the checking extensions on the plates of adjacent links, said cross-wise surfaces consisting of the facing end edges thereof.

3. An actuator according to claim 2, characterized in that the checking extension of each plate extends symmetrically about the transverse centerline of the plate and has a length dimension allowing it to abut against the facing end surface of the checking extension on the adjacent plate, with the plates mutually aligned along a substantially straight direction.

4. An actuator according to claim 2 or 3, characterized in that the plate pairs of adjacent links have checking extensions which are set to alternately converge and diverge toward/away from each other, thereby the facing end surfaces of the checking extensions on adjacent plates can abut against each other in crossing relationship.

5. An actuator according to claim 1, characterized in that the side of the plates of each link facing toward the drive sprocket is made concave to match the radius of curvature of a drive sprocket hub.

6. An actuator according to claim 1, characterized in that the plates in each plate pair are joined by a wall, with the links in said condition of substantially straight alignment the walls of the plate pairs abutting against each other to form said members for limiting the relative angular displacement of adjacent links.

7. An actuator according to claim 6, characterized in that said walls have ridges, ribs, or the like formations thereon adapted to abut against each other with the links in said condition of substantially straight alignment.

* * * * *